(12) United States Patent
Turner, Jr.

(10) Patent No.: US 7,707,841 B2
(45) Date of Patent: May 4, 2010

(54) PHASE COOLING METHOD AND APPARATUS

(75) Inventor: Garth Elzy Turner, Jr., Semmes, AL (US)

(73) Assignee: Northrop Grumman Ship Systems, Inc., Pascagoula, MS (US)

( * ) Notice: Subject to any disclaimer, the term of this patent is extended or adjusted under 35 U.S.C. 154(b) by 1091 days.

(21) Appl. No.: 11/302,705

(22) Filed: Dec. 13, 2005

(65) Prior Publication Data

US 2006/0213638 A1 Sep. 28, 2006

Related U.S. Application Data

(60) Provisional application No. 60/635,853, filed on Dec. 14, 2004.

(51) Int. Cl.
*F28C 1/00* (2006.01)
(52) U.S. Cl. .............................. 62/121; 62/64; 62/304; 165/45; 165/58; 165/104.33
(58) Field of Classification Search .................. 62/121, 62/304, 64; 165/45, 58, 104.33
See application file for complete search history.

(56) References Cited

U.S. PATENT DOCUMENTS

| | | | |
|---|---|---|---|
| 2,653,517 A | 9/1953 | Pigott | |
| 3,577,808 A | 5/1971 | Visser et al. | |
| 3,646,678 A | 3/1972 | McAlister | |
| 3,842,596 A | 10/1974 | Gray | |
| 3,964,554 A | 6/1976 | Ricks et al. | |
| 4,407,136 A * | 10/1983 | de Kanter | ..................... 62/64 |
| 4,610,579 A | 9/1986 | Frank et al. | |
| 4,857,694 A | 8/1989 | Doyle et al. | |
| 5,004,382 A | 4/1991 | Yoshino | |
| 5,332,341 A | 7/1994 | Arai et al. | |
| 5,567,093 A | 10/1996 | Richmond | |
| 5,826,469 A | 10/1998 | Haradem | |
| 6,341,498 B1 * | 1/2002 | DiFoggio | ................... 62/259.2 |
| 6,769,487 B2 * | 8/2004 | Hache | ........................ 166/302 |
| 6,877,332 B2 * | 4/2005 | DiFoggio | ................... 62/259.2 |

FOREIGN PATENT DOCUMENTS

| | | |
|---|---|---|
| JP | 01178405 A | 7/1989 |
| WO | WO 97/15420 | 5/1997 |

OTHER PUBLICATIONS

PCT/US2005/045386 Notification of Transmittal and International Search Report, Apr. 7, 2006.

* cited by examiner

*Primary Examiner*—Melvin Jones
(74) *Attorney, Agent, or Firm*—Alson & Bird LLP

(57) ABSTRACT

A method and apparatus for cooling a workpiece, tool or the like by subjecting the workpiece, tool or the like to a coolant that has been heated to have a temperature near the temperature at which the coolant changes phase from liquid to gas. Thus, the coolant can quickly draw a substantial amount of heat from the workpiece, tool or the like in order to effect a phase change from liquid to gas. Typically, the coolant is preheated to within a predefined range of the phase change temperature, such as within 5° C. or even 1° C.

19 Claims, 4 Drawing Sheets

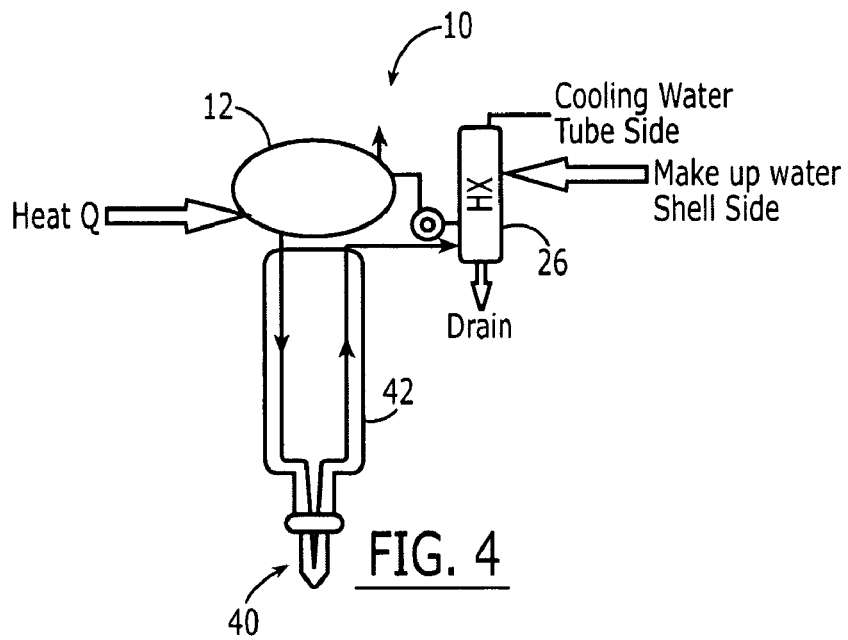
FIG. 4
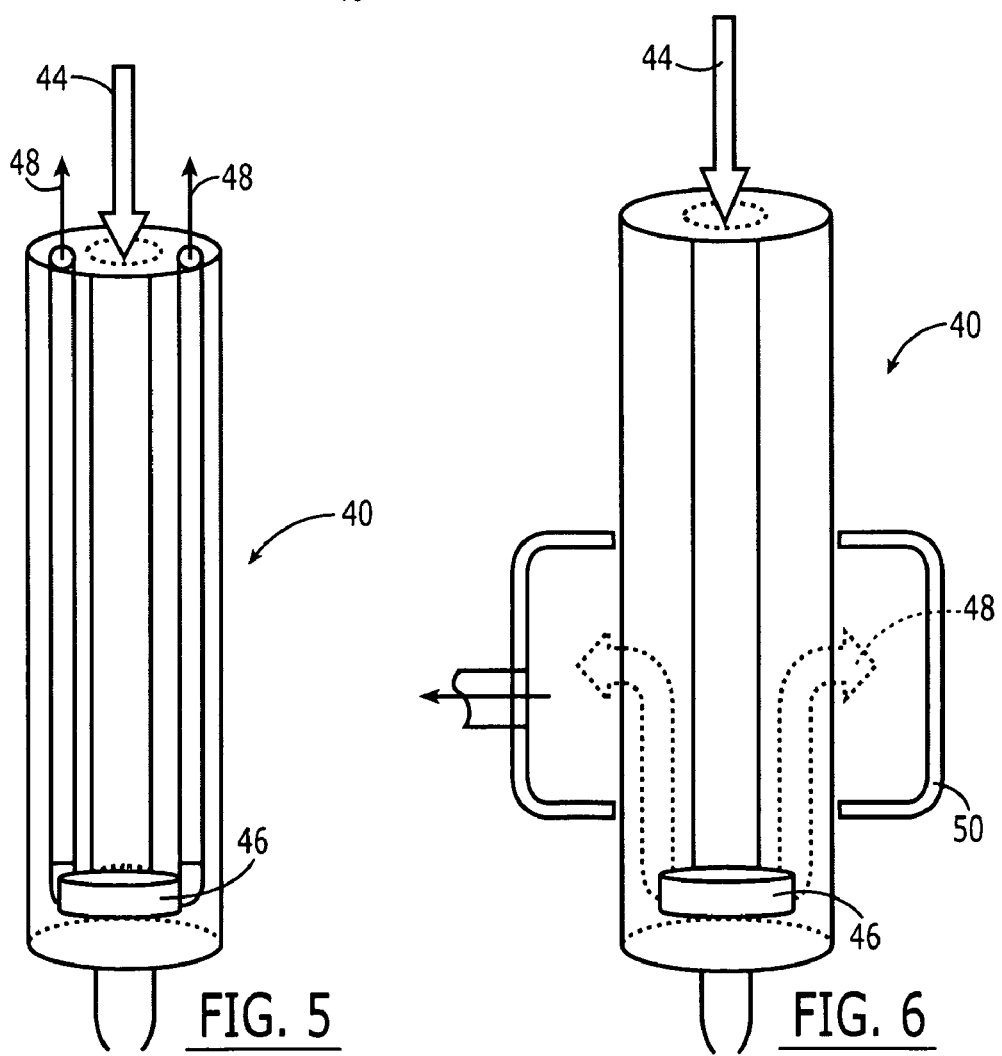
FIG. 5
FIG. 6

PHASE COOLING METHOD AND APPARATUS

CROSS REFERENCE TO RELATED APPLICATION(S)

The present application claims priority from U.S. Provisional Application No. 60/635,853 filed Dec. 14, 2004 and entitled "Phase Cooling Method and Apparatus", the contents of which are incorporated herein in their entirety.

FIELD OF THE INVENTION

The present invention relates generally to methods and apparatus for phase cooling and, more particularly, to methods and apparatus that utilize the phase change of a coolant in order to cool a workpiece, a tool or the like.

BACKGROUND OF THE INVENTION

A number of processes, such as a number of manufacturing processes, require cooling. For example, a workpiece may need to be cooled in order to be properly formed or straightened. Similarly, a bit, such as a drill bit or a bit used for welding applications, such as friction-stir welding, may need to be cooled during use. In order to provide for such cooling, a coolant, such as water, is frequently placed in thermal contact with the workpiece, the tool or the like.

For example, metallic plates, such as those formed of steel, may be thermally formed or straightened. In this regard, a metallic plate may be heated, such as by means of an induction head, and thereafter bent or straightened, as desired. In order to initiate the bending or straightening process, the heated, metallic plate is quenched with a considerable amount of water. By quenching the metallic plate, the metal matrix recrystallizes which causes the metallic plate to bend or be straightened, as desired.

Similarly, tools, such as bits, generally experience an increase in temperature during use. With respect to a drill bit or a bit for use in welding applications, such as friction-stir welding applications, coolant, such as water, is commonly sprayed on or circulated through channels in such bits in order to cool the bits and permit continued machining.

Relatively cool water is typically utilized in these applications. Cooling is therefore provided by heat transfer from the workpiece or tool to the water which increases the temperature of the water. The cooling provided by such conventional techniques is not very quick, however, since the temperature of one gram of water increases by 1° C. in response to transfer of only one calorie of heat. In a number of applications, it would be advantageous to more quickly transfer heat from a workpiece or tool to the coolant, thereby potentially reducing thermal limitations that are otherwise imposed upon the underlying process.

BRIEF SUMMARY OF THE INVENTION

Methods and apparatus are provided according to embodiments of the present invention for cooling a workpiece, a tool (such as a bit) or the like by transferring heat from the workpiece, tool or the like to the coolant in such a fashion as to affect a phase change of the coolant, such as from liquid to gas. By providing the coolant in such a manner as to be poised to change phase in response to further heating, the coolant will quickly change phase, such as from liquid to gas, and thereby draw significant amounts of heat from the workpiece, tool or the like. As such, the efficiency of the cooling process and, at least in some instances, the efficiency of the overall manufacturing process may be increased.

In one embodiment, a coolant is heated to a temperature within a predefined range of a phase change temperature at which the coolant will change from liquid to gas. In this regard, the coolant is typically heated to a temperature within 5° C. of the phase change temperature and, in one advantageous embodiment, to within 1° C. of the phase change temperature. The source of the heated coolant then directs the heated coolant in liquid form via a conduit for eventual delivery to a workpiece, a tool or the like. By subjecting the workpiece, the tool or the like to the heated coolant, heat is transferred to the coolant which causes the coolant to change phase from liquid to gas. As a result of the relatively large amount of heat that is required to change the phase of the coolant from liquid to gas (539.4 calories/gram in the case of water), the method and apparatus of embodiments of the present invention can more efficiently cool the workpiece, tool or the like.

Various sources of the heated coolant may be employed. In one embodiment, source is comprised of a vessel in which the coolant is heated to an intermediate temperature and an induction head that receives the coolant from the vessel and then further heats the coolant to within a predefined range of the phase change temperature. Thus, the source may be distributed in some embodiments.

Once the coolant has changed phase, the coolant may be drawn away from the workpiece, the tool or the like, such as by means of a condenser or a venturi pump. In one embodiment, the gaseous coolant may then be condensed so as to change phase from a gaseous state to a liquid state and may be recirculated for again cooling the workpiece, the tool or the like.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 is a schematic representation of an apparatus according to one embodiment of the present invention for cooling a tool, such as a bit;

FIG. 5 depicts a bit according to one embodiment of the present invention that facilitates the circulation of coolant therethrough; and FIG. 6 depicts a bit according to another embodiment of the present invention in which the coolant is collected in a shroud following its circulation through the bit.

DETAILED DESCRIPTION OF THE PREFERRED EMBODIMENT

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The method and apparatus of the present invention may be utilized to cool a variety of workpieces, tools or the like. By way of example, the use of a heated, liquid coolant to cool or quench a workpiece, such as a metallic workpiece, for thermal forming or straightening applications, will initially be described. While a metallic workpiece is a fairly conventional example of a workpiece, the term workpiece is intended to cover a wide variety of structures that are desired to be cooled including, for example, lasers. Other applications of the method and apparatus of the present invention including use for cooling a tool, such as a drill bit, a milling tool or a bit for use in friction-stir welding, will then be described. As used herein, reference to the cooling of at least one of a workpiece and a tool refers to the cooling of a workpiece or the cooling of a tool and not necessarily to the cooling of one of each of a workpiece and a tool. Moreover, the method and apparatus of the present invention can be used to provide cooling in still further applications including injection molding, die cooling, casting and chemical reactors which require at least some components, such as the molds, the dies or the like, to be cooled.

Figure 1:
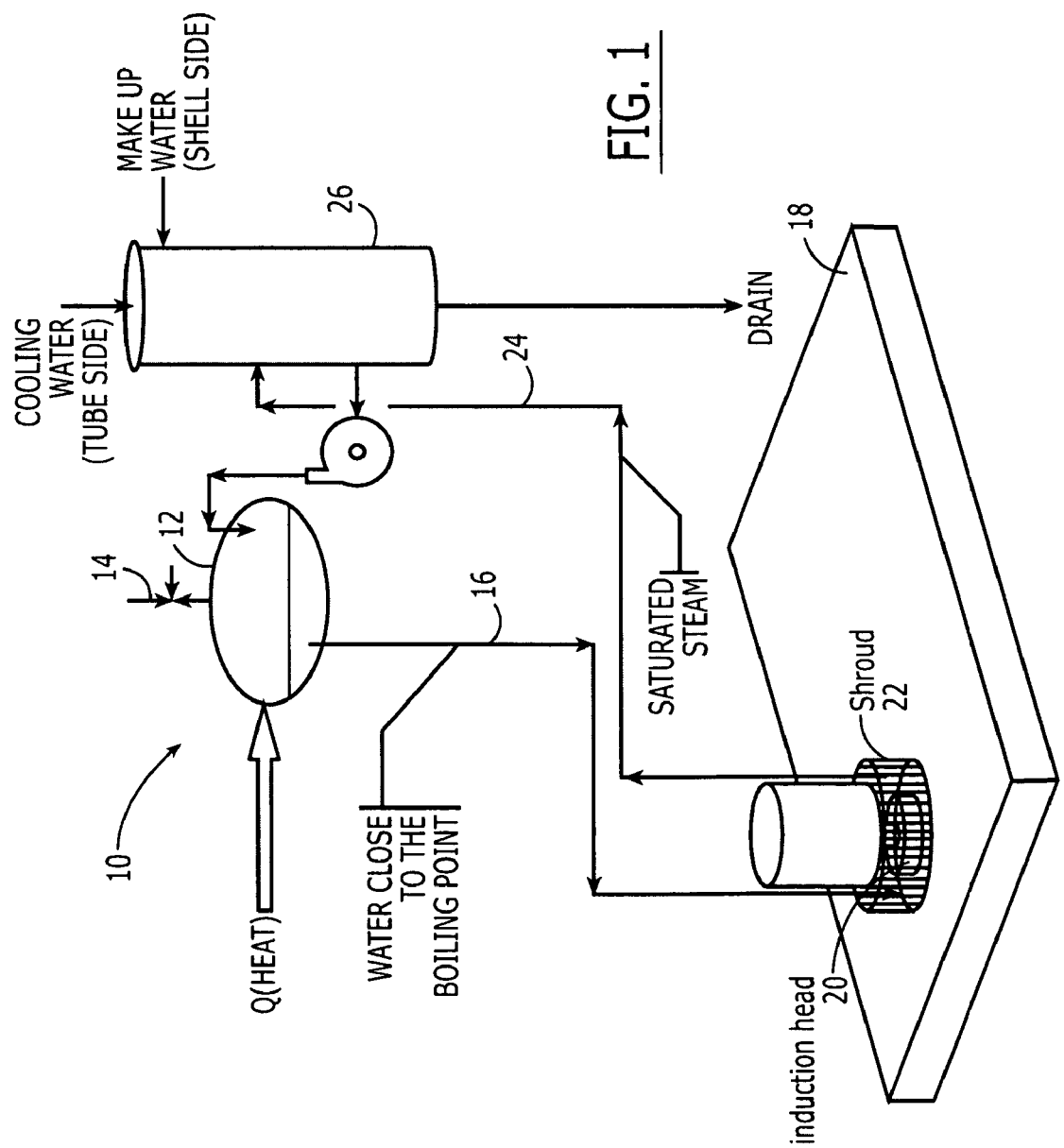
FIG. 1 is a schematic representation of an apparatus according to one embodiment of the present invention which employs a condenser to recirculate the coolant.

With reference to FIG. 1, an apparatus 10 according to one embodiment of the present invention is depicted. The apparatus includes a source 12 of coolant that is heated. In this regard, the source is illustrated schematically as a vessel, but may be embodied in many different manners. The source may also include a popoff valve 14 to relieve excess pressure, if desired. The coolant is introduced into the vessel from the condenser 26 as described below and is heated to a temperature that approaches the phase change temperature at which the coolant will change phase from liquid to gas. In this regard, the coolant is advantageously heated to a temperature within a predefined range of the phase change temperature, such as within 10° C. of the phase change temperature, or within 5° C. of the phase change temperature in another embodiment, or within 1° C. of the phase change temperature in yet another embodiment. As is known to those skilled in the art, the phase change temperature depends upon the coolant as well as the pressure to which the coolant is subjected. In instances in which the coolant is water at atmospheric pressure, the water may be heated by the source to 99° C. Alternatively, in one embodiment in which the pressure is maintained somewhat above atmospheric pressure, the water may be heated to 100° C. so as to be a saturated liquid.

The apparatus 10 of the illustrated embodiment also includes a conduit 16 or other transport element for directing the heated coolant in liquid form from the source 12 to the workpiece 18. In thermal forming and/or straightening applications, the workpiece has also been heated to a temperature greater than the phase change temperature of the coolant such that impingement of the heated coolant upon the workpiece draws heat from the workpiece which, in turn, causes the phase of the heated coolant to change from liquid to gas. In the illustrated embodiment in which a metallic plate is thermally formed, at least a portion of the plate is heated, such as by means of an induction head 20. By subjecting the workpiece to the heated coolant, the workpiece and, more particularly, at least that portion of the workpiece with which the coolant makes contact is quenched causing the metallic matrix to recrystallize and, in some instances, bow or assume some other arcuate or other curved shape as desired.

Upon subjecting the workpiece 18 to the heated coolant, heat is transferred from the workpiece to the coolant. Since the coolant is heated to a temperature near the phase change temperature prior to being directed to the workpiece, the additional heat transferred from the workpiece causes the coolant to change phase. While the temperature of one gram of water will increase by 1° C. in response to transfer of only one calorie of heat, 539.4 calories of heat are required to cause one gram of water at 100° C. to change phase to steam at 100° C. Thus, by providing the coolant to the workpiece in a heated state that is poised to change phase upon the addition of more heat, the coolant and, in particular, the phase change of the coolant, may cause the workpiece to be cooled more rapidly and efficiently than conventional designs in which the temperature of the coolant is merely increased while the phase of the coolant remains the same.

As shown in FIG. 1, the apparatus 10 of the present invention also generally includes a shroud 22 surrounding that portion of the workpiece 18 that is subjected to the heated coolant for collecting the gaseous form of the coolant that results following heat transfer from the workpiece. A conduit 24 may be connected at one end to the shroud and at the other end to a vacuum or other relatively low-pressure source for drawing the gaseous phase of the coolant away from the workpiece. While various low-pressure sources may be utilized, the apparatus of the embodiment depicted in FIG. 1 includes a condenser 26 connected to the shroud by means of a conduit.

As known to those skilled in the art, the condenser 26 operates at a relatively low pressure so as to draw the gaseous phase of the coolant from within the shroud 22. A tube generally passes through the condenser through which cooling water passes so as to cool and condense the coolant which returns to a liquid form. This liquid form of the coolant may then be returned to the source 12 for recirculation through the system. As shown in FIG. 1, additional make-up coolant may be introduced into the condenser and combined with the recirculated coolant. By recirculating the coolant, the efficiency of the apparatus 10 is further increased since the liquid phase of the coolant that is returned from the condenser to the source may be returned at a temperature near the phase change temperature such that only a minimal amount of heat is required to properly heat the coolant prior to again directing the heated coolant to the workpiece 18.

In addition to the increased efficiency with which the coolant cools the workpiece 18, the method and apparatus 10 of the present invention also provide several other advantages. With respect to thermal forming and straightening, the coolant is evaporated and then quickly drawn away so as not to remain upon and corrode the workpiece; which is of particular concern with respect to workpieces formed of carbon steel. Additionally, the evaporation of the coolant leaves the workpiece dry and the surrounding air clear so as to facilitate the use of a laser scanning measuring system to measure the "as-formed" workpiece following the forming or straightening process. Typically, however, at least some water remains on the surface of the workpiece so as to provide evidence of the occurrence of the maximum heat transfer from the workpiece.

In some embodiments, a coolant is also circulated through the induction head 20 in order to cool the induction head. In order to further increase the efficiency of the overall cooling process, the same coolant that will be applied to the workpiece 18 to cool the workpiece can first be circulated through the induction head to cool the induction head. Not only does the circulation of the same coolant through the induction head avoid, at least in some circumstances, the need for a separate source of coolant for circulation through the induction head, but the circulation of the same coolant through the induction head serves to further heat the coolant. In other words, heat is transferred from the induction head to the coolant, thereby advantageously cooling the induction head and heating the coolant. Thus, the coolant that is provided by the source 12 need not be heated to as high of a temperature since the coolant will be subsequently further heated while passing through or over the induction head prior to impinging upon the workpiece. For example, the source of the heated coolant may be comprised of both a vessel in which the coolant is heated to an intermediate temperature, such as 90° C., for example, and an induction head that receives the coolant at the intermediate temperature and that further heats the coolant to within a predefined range of the phase change temperature, such as 99° C., for example, while concurrently cooling the induction head, thereby illustrating that the source may be distributed. By reducing the heating requirements associated with the coolant provided by the source and, instead, relying upon the additional heat transferred to the coolant while cooling the induction head, less energy is expended to heat the coolant in the source such that the overall efficiency of the cooling process is increased while still heating the coolant to a temperature within a predefined range of the phase change temperature.

Figure 2:
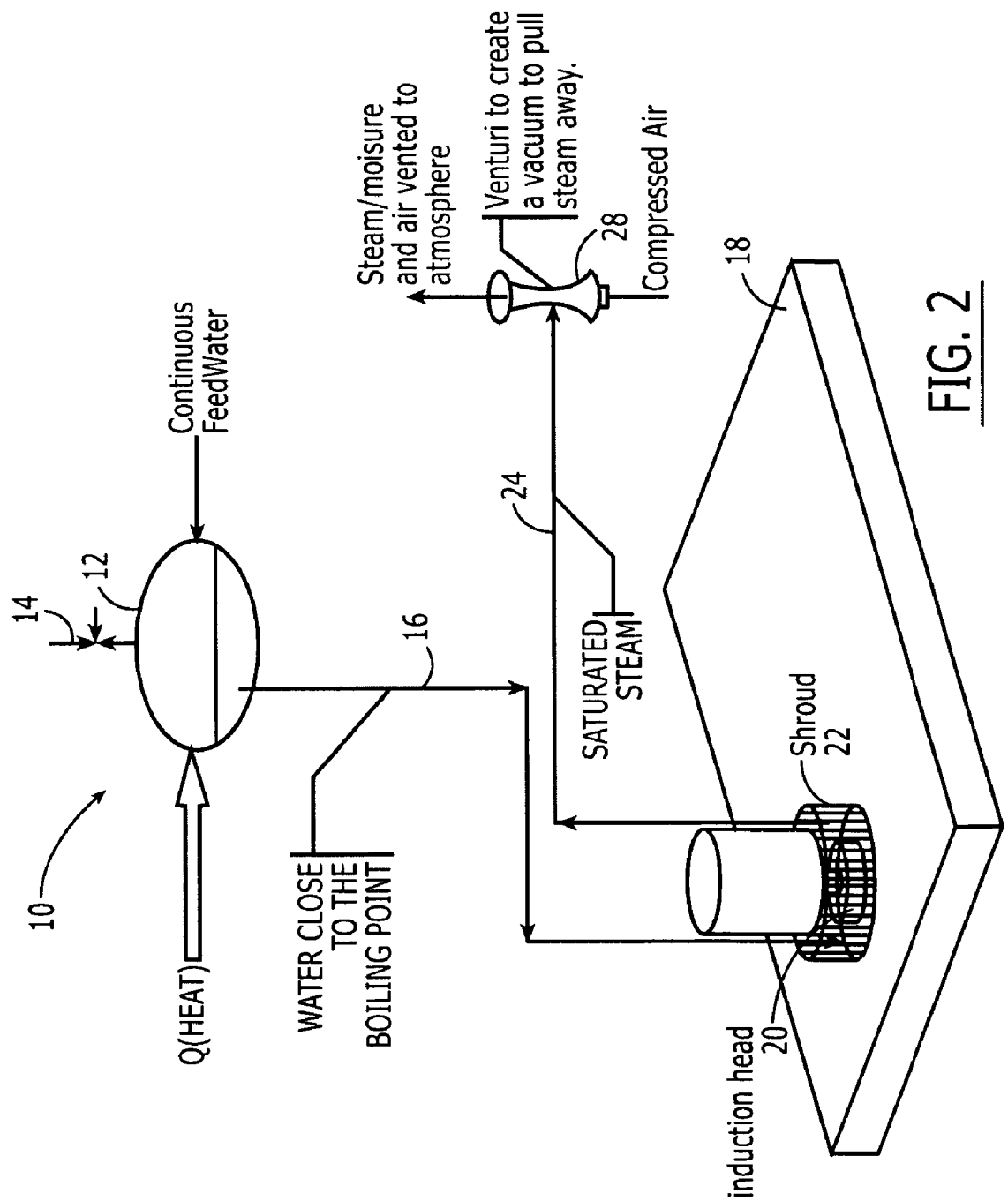
FIG. 2 is a schematic representation of an apparatus according to another embodiment of the present invention which employs a venture pump.

As indicated above, various low-pressure sources 26 may be utilized to draw the gaseous form of the coolant away from the workpiece 18. As shown in FIG. 2, for example, a venturi pump 28 may be utilized to create a vacuum that pulls the steam away from the workpiece. In this regard, compressed air may be passed through the venturi pump to create a vacuum and draw the steam which then mixes with the compressed air and is vented to atmosphere. In this embodiment, the coolant is not recirculated and, instead, a supply of coolant must continually be resupplied to the source if continuous operation is desired for some period of time. Advantageously, however, the embodiment of the method and apparatus 10 which includes a venturi pump would be more readily portable than other embodiments of the present invention.

Figure 3:
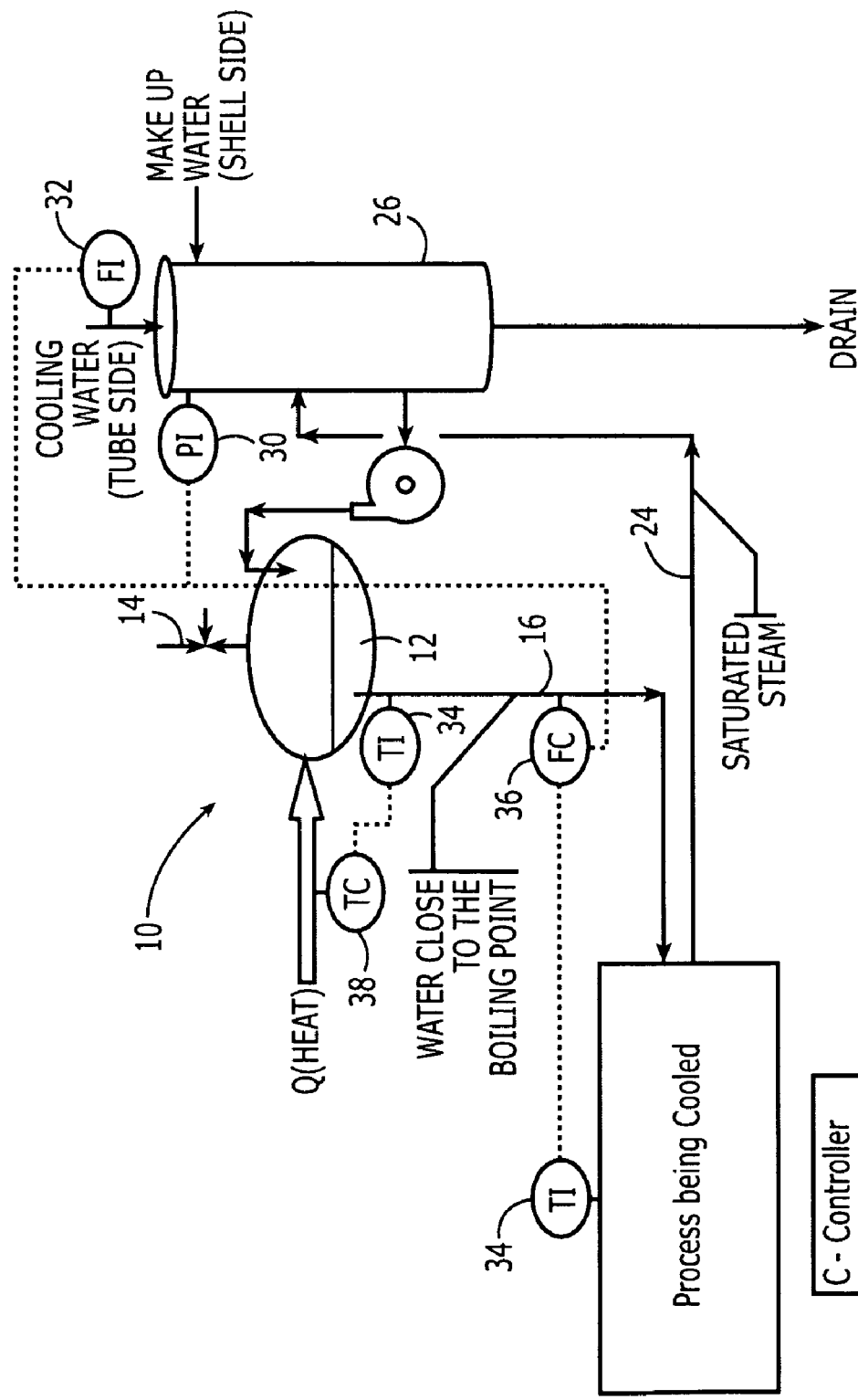
FIG. 3 is a schematic representation of the apparatus of FIG. 1 which further depicts an associated control system.

The apparatus 10 of the present invention generally includes an associated control system for controlling the flow rate and temperature of the coolant. As shown in FIG. 3 in conjunction with the embodiment of FIG. 1, the pressure within the condenser 26 may be monitored as indicated by pressure sensor 30, along with the flow rate of the cooling water entering the condenser as indicated by flow rate sensor 32. The temperature of the coolant in or exiting the source 12 and the temperature of the workpiece, tool or the like may likewise be monitored by respective temperature sensors 34. As indicated by the dashed lines in FIG. 3, these various sensors may be communicably connected to a flow rate controller 36 and a temperature controller 38 to control the flow rate of coolant directed to the workpiece, tool or the like and the temperature of the coolant within the source, respectively. Although one embodiment of a control system is depicted in FIG. 3 and is described above, the method and apparatus of the present invention may include many other types of control systems without departing from the spirit and scope of the present invention.

In instances in which it is desired to cool the workpiece to a temperature of less than the phase change temperature, such as 100° C., the cooling may be performed in stages. The cooling brought about by the phase change of the coolant described above may be performed initially to bring the temperature of the workpiece to the phase change temperature. The workpiece may then be subject to other, more conventional cooling processes to further reduce its temperature to a desired final temperature. In instances in which a subsequent cooling stage involves the exposure of the workpiece to coolant that does not change phase but that, instead, increases in temperature as the coolant absorbs heat from the workpiece, the coolant can be introduced to the condenser 26 of the embodiment depicted in FIG. 1 as make-up coolant. By allowing the coolant to absorb heat from the workpiece prior to its introduction to the condenser as make-up coolant, the make-up coolant is effectively preheated, thereby reducing the overall heating requirements and increasing the operational efficiency.

While water has been described above as a coolant, other coolants may be utilized having different phase change temperatures. In addition, the coolant may be heated by the source 12 to temperatures above or below the boiling point by correspondingly altering the pressure to which the coolant is subjected as known to those skilled in the art.

Additionally, the coolant may be aspirated prior to its impingement upon the workpiece 18 to facilitate the subsequent phase change of the coolant. In this regard, air may be mixed with the heated coolant to create a plurality of droplets of the coolant, each typically having a relatively small size. The coolant droplets then impinge upon the workpiece and are heated by the transfer of energy from the workpiece to the coolant which causes the coolant to change phase. By having provided the coolant in droplets, the coolant is evaporated more quickly as a result of the increased surface area of the coolant, thereby increasing the rate at which the coolant cools the workpiece. In aspirating the coolant, the temperature of the air is advantageously controlled such that the resulting droplets of coolant have a temperature within the predefined range of the phase change temperature.

In addition to thermal forming and straightening operations, the method and apparatus 10 of the present invention may be employed to cool a tool, such as a drill bit, a milling tool or bit for use with friction-stir welding applications. As shown in FIG. 4, for example, a tool, such as a bit 40, may define one or more passageways that extend through all or a portion of the shank and the machine 42 that drives the bit to a location proximate the cutting or machining surfaces. These passageways as well as the tubing or other plumbing that extends from the source 12 to the tool are considered transport elements or conduits for purposes of the present application. As shown in FIG. 4 and as described above in conjunction with the embodiments of FIGS. 1 and 2, a heated coolant is directed to the tool and through the passageway defined by the tool. As the tool is heated as a result of the machining operation, heat is transferred from the tool to the coolant which causes the coolant to change phase from liquid to gas. As also shown in FIG. 4 and described above in conjunction with the embodiments of FIGS. 1 and 2, a low-pressure source, such as a condenser 26, a venturi pump 28 or the like may be connected to another passageway defined by the tool for drawing the gaseous phase of the coolant away from the machining surfaces of the tool. As described above, the gaseous phase of the coolant may be condensed and recirculated or may be discharged, as desired.

The tool may be configured in several different manners so as to allow the heated coolant to be delivered to that portion of the tool from which it is desirable to withdraw heat. As shown in FIG. 5, for example, the tool, such as a drill bit 40, may define an entrance passageway 44, such as a longitudinally-extending central passageway which serves as at least a portion of the transport element in this embodiment, through which heated coolant is delivered to a vaporization chamber 46 defined near the tip of the tool and, in any event, proximate that portion of the tool from which heat is to be transferred. One or more exit passageways 48 are also defined by the tool of this embodiment that extend longitudinally from the vaporization chamber and are in fluid communication with a condenser 26, a venturi pump 28 or other low-pressure source for permitting the gaseous phase of the coolant to be withdrawn from the vaporization chamber following the phase change brought about by the transfer of heat from the tool to the coolant.

In conjunction with the embodiment of the tool depicted in FIG. 5, the exit passageways 48 may be connected via conduits to the low-pressure source. Alternatively, the exit passageways may exit, such as through the rear or a side surface of the tool, into a shroud 50 that collects the gaseous phase of the coolant, as shown in FIG. 6. As described above in conjunction with the embodiments of the method and apparatus of FIGS. 1 and 2, the shroud may be in fluid communication, such as one or more conduits or other transport elements, with the low-pressure source. In either embodiment, the tool will generally be fitted with O-rings and fittings to allow coolant to enter and exit the respective passageways even as the tool spins about its longitudinal axis. The tool may be formed of various materials but, in one embodiment, is a bit formed of a molybdenum and tungsten alloy. If desired, the coolant may also be aspirated prior to entry into the vaporization chamber 46 to facilitate rapid evaporation of the coolant as described above.

In a comparable fashion to that described above in conjunction with the tool of FIGS. 4-6, the method and apparatus 10 of the present invention can be employed in other applications, such as to circulate a heated coolant through a mold that is utilized for injection molding operations in order to controllably and efficiently cool the mold. Similarly, heated coolant may be circulated through the die(s) utilized in die casting and other forming operations to efficiently and quickly cool the die(s). Additionally, heated coolant may be circulated through the reactor vessels in which various chemical reactions are carried out, as well as in a wide variety of other applications.

Regardless of the application, the method and apparatus 10 of the present invention take advantage of the substantial amount of heat that is drawn from a workpiece, a tool or the like in effecting the change in phase of the coolant from liquid to gas in order to more efficiently and more quickly cool a workpiece, a tool or the like which, in turn, may increase the efficiency of the resulting manufacturing process.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of cooling at least one of a workpiece and a tool, the method comprising:
   heating a coolant to a temperature within 10° C. of a phase change temperature at which the coolant will change phase from liquid to gas; and
   subjecting at least one of the workpiece and the tool to the heated coolant in liquid form such that heat transfer to the coolant from at least one of the workpiece and the tool will cause the coolant to change phase from liquid to gas.

2. A method according to claim 1 wherein heating the coolant comprises heating the coolant to within 5° C. of the phase change temperature.

3. A method according to claim 1 wherein heating the coolant comprises heating the coolant to within 1° C. of the phase change temperature.

4. A method of cooling at least one of a workpiece and a tool, the method comprising:
   heating a coolant to a temperature within 10° C. of a phase change temperature at which the coolant will change phase from liquid to gas;
   subjecting at least one of the workpiece and the tool to the heated coolant in liquid form such that heat transfer to the coolant from at least one of the workpiece and the tool will cause the coolant to change phase from liquid to gas; and
   drawing the coolant in gaseous form away from at least one of the workpiece and the tool.

5. A method according to claim 4 further comprising condensing the gaseous coolant such that the coolant changes phase from gas to liquid.

6. A method of cooling at least one of a workpiece and a tool, the method comprising:
   heating a coolant to a temperature within 10° C. of a phase change temperature at which the coolant will change phase from liquid to gas;
   subjecting at least one of the workpiece and the tool to the heated coolant in liquid form such that heat transfer to the coolant from at least one of the workpiece and the tool will cause the coolant to change phase from liquid to gas; and
   aspirating the coolant prior to subjecting at least one of the workpiece and the tool to the heated coolant.

7. An apparatus for cooling at least one of a workpiece and a tool, the apparatus comprising:
   a source of coolant that has been heated to a temperature within 10° C. of a phase change temperature at which the coolant will change phase from liquid to gas; and
   a transport element for directing the heated coolant in liquid form from said source for eventual delivery to at least one of the workpiece and the tool such that heat transfer to the coolant from at least one of the workpiece and the tool will cause the coolant to change phase from liquid to gas.

8. An apparatus according to claim 7 wherein said source provides coolant that is within 5° C. of the phase change temperature.

9. An apparatus according to claim 7 wherein said source provides coolant that is within 1° C. of the phase change temperature.

10. An apparatus for cooling at least one of a workpiece and a tool, the apparatus comprising:
    a source of coolant that has been heated to a temperature within a predefined range of a phase change temperature at which the coolant will change phase from liquid to gas;
    a transport element for directing the heated coolant in liquid form from said source for eventual delivery to at least one of the workpiece and the tool such that heat transfer to the coolant from at least one of the workpiece and the tool will cause the coolant to change phase from liquid to gas; and
    at least one of a condenser or a Venturi pump for drawing the coolant in gaseous form away from at least one of the workpiece and the tool.

11. An apparatus according to claim 7 wherein the condenser is further configured to condense the gaseous coolant such that the coolant changes phase from gas to liquid.

12. An apparatus for cooling at least one of a workpiece and a tool, the apparatus comprising:

a source of coolant that has been heated to a temperature within a predefined range of a phase change temperature at which the coolant will change phase from liquid to gas, wherein said source comprises:
- a vessel in which the coolant is heated to an intermediate temperature; and
- an induction head for receiving the coolant at the intermediate temperature from the vessel and for further heating the coolant to within the predefined range of the phase change temperature; and a transport element for directing the heated coolant in liquid form from said source for eventual delivery to at least one of the workpiece and the tool such that heat transfer to the coolant from at least one of the workpiece and the tool will cause the coolant to change phase from liquid to gas.

13. An apparatus according to claim 12 wherein said transport element comprises a conduit extending from said vessel to said induction head.

14. An assembly comprising:
- a bit to be cooled by coolant circulated therethrough;
- a source of coolant that has been heated to a temperature within 10° C. of a phase change temperature at which the coolant will change phase from liquid to gas; and
- a transport element for directing the heated coolant in liquid form from said source for eventual delivery to and circulation through the bit such that heat transfer to the coolant from the bit will cause the coolant to change phase from liquid to gas.

15. An assembly according to claim 14 wherein said source provides coolant that is within 5° C. of the phase change temperature.

16. An assembly according to claim 14 wherein said source provides coolant that is within 1° C. of the phase change temperature.

17. An assembly according to claim 14 further comprising a Venturi pump for drawing the coolant in gaseous form away from the bit.

18. An assembly according to claim 14 wherein said source comprises:
- a vessel in which the coolant is heated to an intermediate temperature; and
- an induction head for receiving the coolant at the intermediate temperature from the vessel and for further heating the coolant to within the predefined range of the phase change temperature.

19. An assembly according to claim 18 wherein said transport element comprises a conduit extending from said vessel to said induction head.

* * * * *